United States Patent
Horoszczak et al.

(10) Patent No.: US 10,393,278 B2
(45) Date of Patent: Aug. 27, 2019

(54) CHECK VALVE

(71) Applicant: Hamilton Sundstand Corporation, Charlotte, NC (US)

(72) Inventors: Adam Horoszczak, Wroclaw (PL); Maciej Ostrowski, Kamieniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/678,350

(22) Filed: Aug. 16, 2017

(65) Prior Publication Data

US 2018/0051818 A1    Feb. 22, 2018

(30) Foreign Application Priority Data

Aug. 16, 2016 (EP) ..................... 16461551

(51) Int. Cl.
| | |
|---|---|
| *F16K 15/02* | (2006.01) |
| *F16K 15/03* | (2006.01) |
| *F16K 11/10* | (2006.01) |
| *F16K 31/12* | (2006.01) |

(52) U.S. Cl.
CPC ............ *F16K 15/023* (2013.01); *F16K 11/10* (2013.01); *F16K 15/035* (2013.01); *F16K 31/12* (2013.01)

(58) Field of Classification Search
CPC .... F16K 15/023; F16K 15/035; F16K 15/028; F16K 31/12; F16K 11/10; Y10T 137/7839
See application file for complete search history.

(56) References Cited

U.S. PATENT DOCUMENTS

| | | | |
|---|---|---|---|
| 1,164,089 A * | 12/1915 | Haney | .......... F16K 15/038 137/512.1 |
| 3,334,569 A | 8/1967 | Russell | |
| 3,689,942 A | 9/1972 | Rapp | |
| 5,222,519 A | 6/1993 | Sato et al. | |
| 2005/0016595 A1* | 1/2005 | Maeda | ........... F04D 25/14 137/512.1 |
| 2011/0116909 A1* | 5/2011 | Weisser | ....... F04D 25/0613 415/126 |

FOREIGN PATENT DOCUMENTS

| | | |
|---|---|---|
| CN | 201982735 U | 9/2011 |
| CN | 203906901 U | 10/2014 |
| EP | 0669502 A2 | 8/1995 |
| JP | 2001349453 A | 12/2001 |

OTHER PUBLICATIONS

European Search Report for Application No. 16461551.0-1751 dated Jan. 27, 2017, 5 pages.

* cited by examiner

*Primary Examiner* — William M McCalister
*Assistant Examiner* — Patrick C Williams
(74) *Attorney, Agent, or Firm* — Cantor Colburn LLP

(57) ABSTRACT

A check valve comprises a valve housing defining an opening and a plurality of flapper elements each pivotally mounted to the valve housing about a respective axis transverse to the opening in which the flapper elements permit flow of fluid through the opening and a closed position in which they block the flow of fluid through the opening. Each flapper element comprises a first side facing the valve housing sealing surface in the closed position, a second side, opposed to the first side and facing away from the valve housing sealing surface in the closed position, a base end, a first edge region extending away from the base end and a second edge region extending away from the base end.

15 Claims, 7 Drawing Sheets

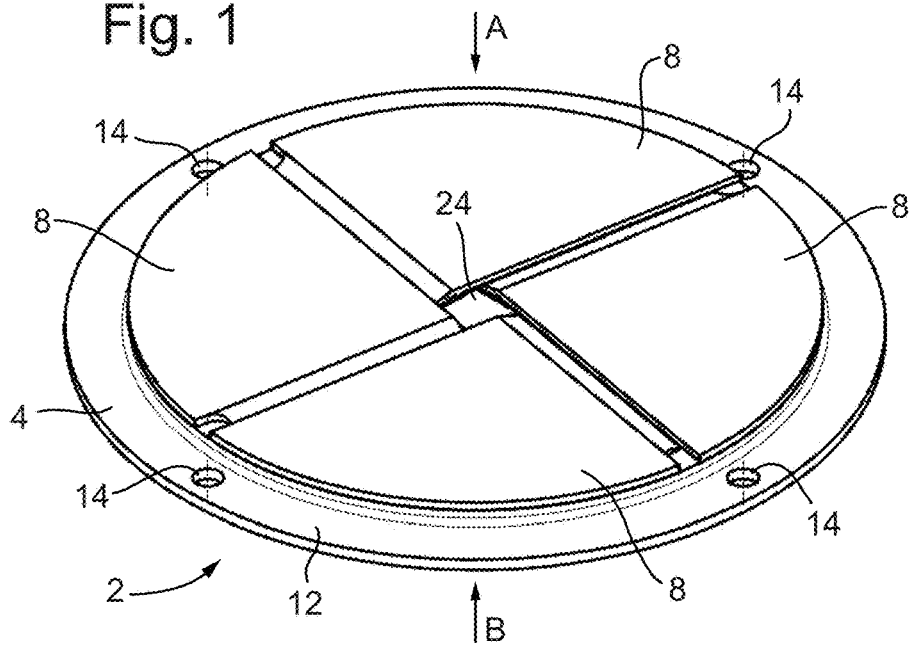
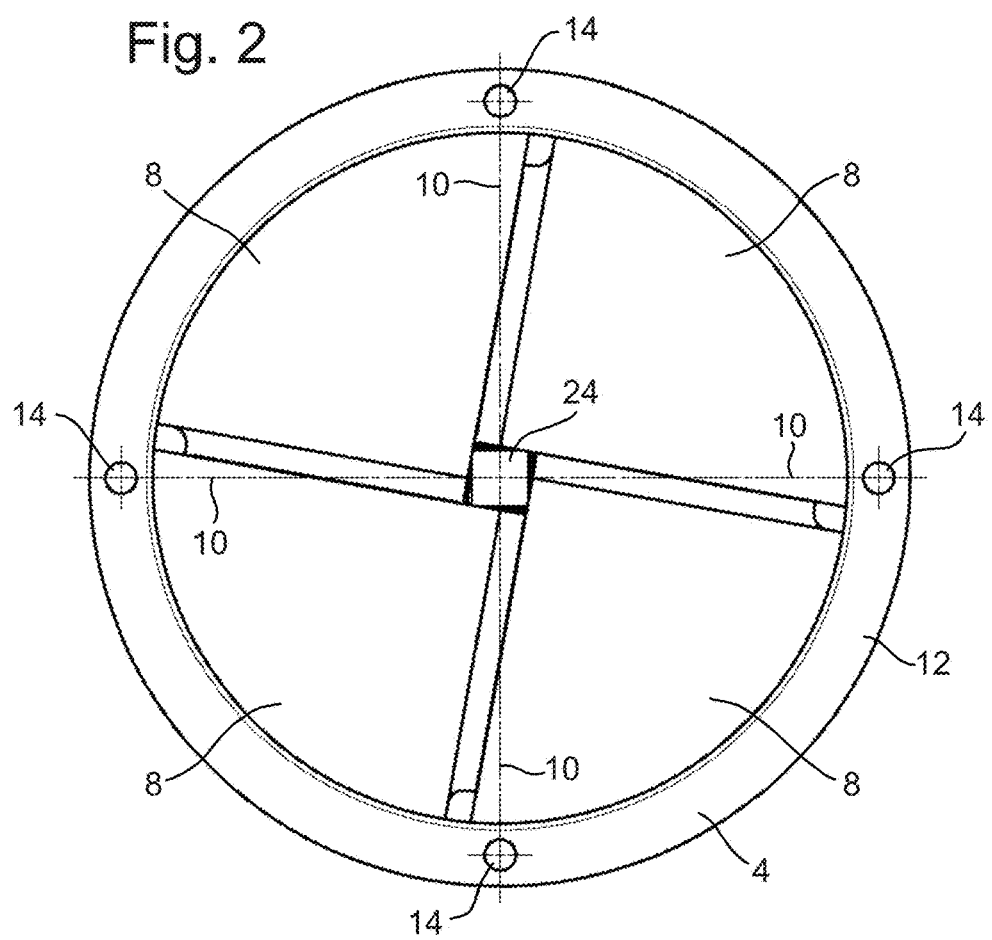

CHECK VALVE

FOREIGN PRIORITY

This application claims priority to European Patent Application No. 16461551.0 filed Aug. 16, 2016, the entire contents of which is incorporated herein by reference.

TECHNICAL FIELD

The present disclosure relates to check valves.

BACKGROUND

Check valves are used to allow fluid flow in one direction, and to prevent flow in the opposite direction. Check valves are widely used in a wide variety of applications, for example in air conditioning systems, for example in aircraft air conditioning systems. Many types of check valves are known. Some check valves include hinged flappers that open in the direction of fluid flow. In such valves, when a fluid pressure exceeds a predetermined valve "cracking pressure", the flappers of the valve open. Likewise, if significant pressure drops in the upstream fluid are experienced (such that there is a negative pressure differential across the valve), the flapper elements close, preventing flow reversal. Such check valves typically include a pair of flapper elements and frequently employ stop pins or bumpers which restrict movement of the flapper past a predetermined maximum opening angle.

The flapper elements of such prior art flapper valves typically move through large angles, before impacting the stop pin or bumper when the maximum opening angle is reached. Moreover each flapper is relatively large (typically being semi-circular in shape). The impact of the flappers against the stop pin or bumper may therefore be relatively large Also, since the flappers are relatively large (and therefore relatively massive), the reaction time of the valve may be quite high.

The present disclosure relates to a check valve which a modified flapper arrangement.

SUMMARY

Disclosed herein is a check valve. The check valve comprises a valve housing defining an opening. A valve housing sealing surface surrounds the opening. The valve further comprises a plurality of flapper elements. Each flapper element is pivotally mounted to the valve housing about a respective axis transverse to the opening, for rotation between an open position in which the flapper elements permit flow of fluid through the opening and a closed position in which they block the flow of fluid through the opening. Each flapper element has a first side facing the valve housing sealing surface in the closed position, a second side, opposed to the first side and facing away from the valve housing sealing surface in the closed position and a base end. The flapper element is mounted to the valve housing at its base end. The flapper element further includes a first edge sealing region extending away from the base end for sealing engagement with the valve housing sealing surface in the closed position of the flapper element, and a second edge sealing region extending away from the base end for sealing engagement with the base end of an adjacent flapper element in the closed position of the flapper element. An edge of the second edge sealing region of the flapper element engages the second side of an adjacent flapper element when the flapper elements are in the open position.

The edge of said second edge sealing region may engage the second side of the adjacent flapper element along a line contact when the flapper elements are in the open position.

The pivotal axes may be defined by respective shafts which extend inwardly across the valve housing opening towards a central axis of the opening. The base portion of each flapper element may be pivotally supported on a respective shaft.

The shafts may be joined by a hub element in the central axis region of the opening.

An edge region of the base end of a flapper element may sealingly cooperate with an adjacent part of the hub element when the flapper element is in the closed position.

The base end of each flapper element may comprise a sealing surface along an edge region thereof on the first side of the flapper element for sealing engagement with the second side of the adjacent flapper element (in the second edge sealing region thereof.

The base end sealing surface may be co-planar with the valve housing sealing surface (in the closed position.

The base end sealing surface may be is arranged, at least in part, rearwardly of the flapper pivot axis.

The base end may further comprise an inclined ramp surface joining said base end sealing surface to a main body portion of the flapper element.

The inclined ramp surface may be provided with a low friction and/or wear resistant coating.

The edge of the second edge sealing region of the flapper element may form an acute angle with the pivot axis of the flapper element.

The acute angle may be between 75° and 85°, for example 80°.

The check valve may comprise four flapper elements, the pivot axes of the flapper elements being perpendicular to one another.

The valve housing opening may be circular in shape and the first edge sealing region of the flapper element arcuate.

The second edge sealing region of the flapper element may be straight.

BRIEF DESCRIPTION OF DRAWINGS

An embodiment of the disclosure will now be described by way of example only with reference to the accompanying drawings in which:

FIG. 1 shows a perspective view of a check valve in accordance with the disclosure in a closed position;

FIG. 2 shows a top plan of the check valve of FIG. 1 in the closed position;

DETAILED DESCRIPTION

Figure 3:
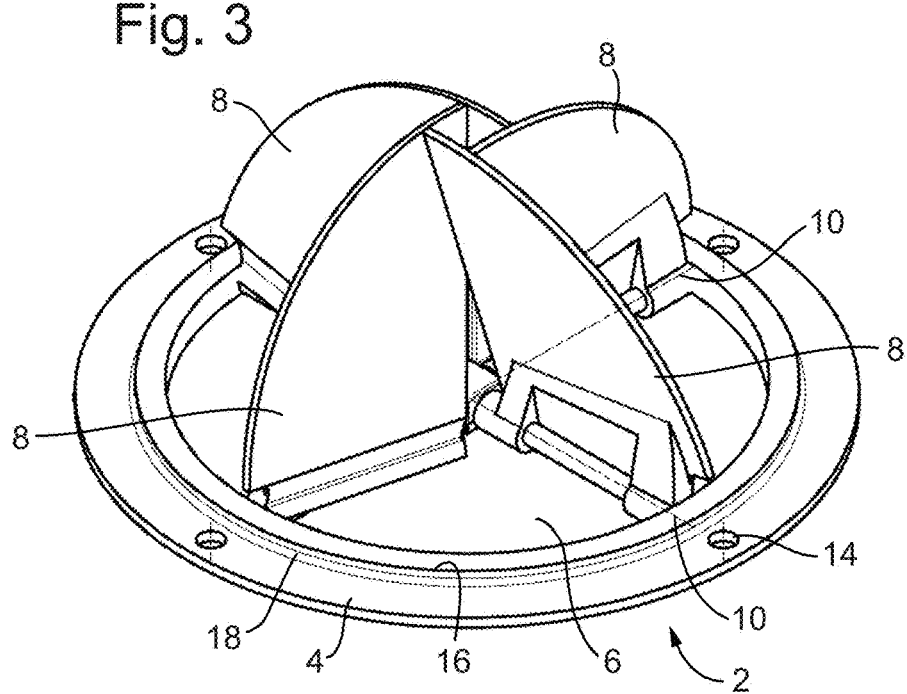
FIG. 3 shows a perspective view of the check valve of FIG. 1 in the open position.

With reference firstly to FIGS. 1 to 8, an embodiment of check valve 2 in accordance with the disclosure comprises a valve housing 4 which defines a valve opening 6 and a plurality of flapper elements 8. As will be described in detail below, each flapper element 8 is pivotally mounted to the valve housing 4 about a respective pivot axis 10 transverse to the opening 6, for rotation between an open position (shown in FIGS. 3 and 4) in which the flapper elements 8 permit flow of fluid through the opening 6 and a closed position (shown in FIGS. 1 and 2) in which they block the flow of fluid through the opening 6.

In this embodiment, the valve housing 4 is formed as an annular valve body, surrounding a circular opening 6. However, it will be appreciated that other shapes of openings 6 and housings 4 fall within the scope of this disclosure.

The valve housing 4 comprises an annular flange portion 12 which comprises a plurality of through holes 14 (in this particular embodiment four) for receiving fasteners for mounting the check valve 2 in a pipe, duct or opening. Of course the valve housing 4 may be mounted by any suitable means.

A valve housing sealing surface 16 is formed around the valve housing opening 6. In this embodiment, the valve housing sealing surface 16 is formed as a circumferentially continuous surface, although in other embodiments, it may be formed from a number of circumferentially spaced sections.

In this embodiment, the valve housing sealing surface 16 is formed on a lip 18 extending axially from a radially inner portion of the flange portion 12 of the valve housing 4. The valve housing sealing surface 16 may be formed integrally with the valve housing 4 or attached thereto. Thus in certain embodiments, the valve housing sealing surface 16 will be of the same material as the valve housing body, but in other embodiments it may be formed of another material, for example a resilient material.

The flapper elements 8 are pivotally mounted to the housing about respective pivot axes 10. In this embodiment, the respective axes 10 are defined by respective shafts 20 which are mounted to the valve housing 4. The pivot axes 10 and shafts 20 extend diametrically across the valve housing opening 6, each shaft 20 extending inwardly from the inner periphery of the valve housing opening 6 towards the central axis 22 of the valve housing opening 6. The shafts 20 are joined at the central axis 22 by a hub element 24, in this case a square section hub element 24.

In certain embodiments, the shafts 20 and hub element 24 may be formed as an integral component. In other embodiments, the shafts 24 may be made separately from the hub element 24 and mounted thereto. The shafts 20 may be mounted in slots (not shown) through the valve housing sealing surface 16 and retained therein by suitable means such as fasteners, plugs, brazing etc. Indeed, the flapper elements 8 may be preassembled to the shafts 20 and that assembly then mounted to the valve housing 4.

Turning now to FIGS. 9 to 13, with continuing reference to FIGS. 1 to 8, the flapper element 8 will now be described in greater detail.

Each flapper element 8 comprises a generally plate-like body having a first side 28 which, when the flapper element 6 is in a closed position, faces towards the valve housing sealing surface 16 and a second side 30, opposed to the first side 28 and facing away from the valve housing sealing surface 16 in the closed position. The flapper element further comprises a base end 32, a first edge 34 extending away from the base end 34 and a second edge 36 also extending away from the base end 32. The first and second edges 34, 36 meet at an apex 38. In this embodiment, as there are four flapper elements 8 and as the valve housing opening 6 is circular, each flapper element 8 is generally in the shape of a quadrant, the first edge 34 being in the shape of an arc subtending an angle of 90°. The particular shape of the flapper element 8 will be determined by the shape of the valve housing 16 and the number of flapper elements.

A first edge sealing region 34a is defined on the first side 28 of the flapper element 8 along the first edge 34. A second edge sealing region 36a is defined on the first side 28 of the flapper element 8 along the second edge 36.

The bottom surface of the base end 32 of the flapper element 8 is formed with a pair of mounting lugs 40, each having a bore 42. The bores 42 are aligned and receive a respective shaft 20. While a pair of mounting lugs 40 has been provided in this embodiment, a single mounting lug 40 or more than two mounting lugs 40 may be provided. Respective fillets 44 are provided between the mounting lugs 40 and the main portion 50 of the first side 28 of the flapper element 8 for strengthening purposes.

The base end 32 of each flapper element 8 comprises a sealing surface 46 along a free end portion 48 thereof on the second side 30 of the flapper element 8. As will be described further below, this sealing surface 46 will make a sealing engagement with the first side 28 of an adjacent flapper element 8 in the second edge region 36a thereof. As can be seen, in this embodiment, the base end sealing surface 46 is generally rectangular in shape and it may have a width approximately equal to the width of the valve housing sealing surface 16. Moreover, in this embodiment, when the flapper elements 8 are in the closed position, the base end sealing surface 46 lies substantially co-planar with the valve housing sealing surface 16. Accordingly, the base end sealing surface 46 lies substantially co-planar with the main portion 50 of the first side 28 of the flapper element 8.

Figure 12:
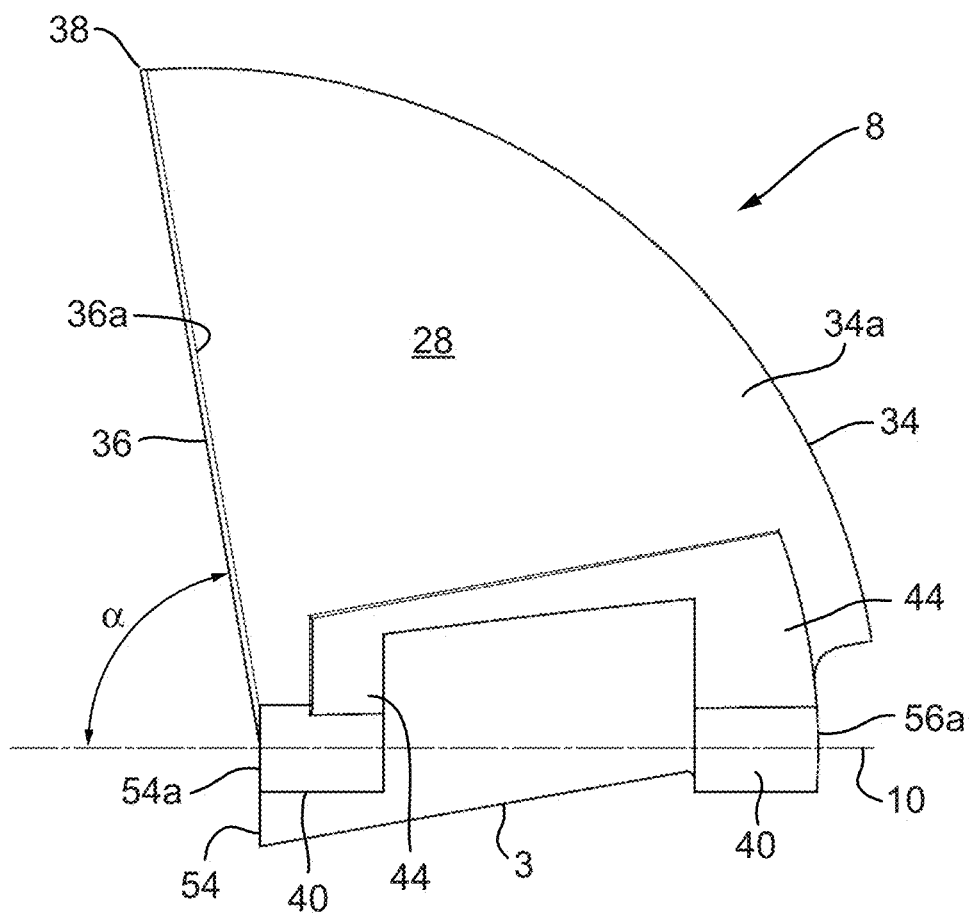
FIG. 12 shows a bottom plan view of the flapper element of FIG. 9.
Figure 13:
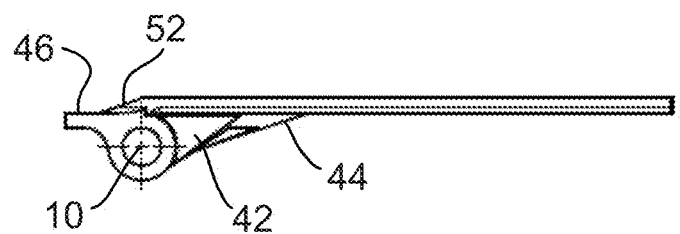
FIG. 13 shows a side view of the flapper element of FIG. 9.

As can be seen, the second edge 36 of the flapper element 8 forms an angle $\alpha$ with the pivot axis 10, as illustrated in FIG. 12. The base end sealing surface 46 may be arranged generally perpendicularly to the second edge 36 of the flapper element 8, as illustrated. The angle $\alpha$ is acute and may typically be between about 75° and 85, for example 80°. In view of the angle of the base end sealing surface 46 relative to the pivot axis 10, a radially outward portion 46a of the base end sealing surface 46 is formed forwardly of the pivot axis 10 and a radially inner portion 46a of the base end sealing surface 46 is formed forwardly of the pivot axis 10.

The base end sealing surface 46 is joined to the main portion 51 of the second side 30 of the flapper element 8 by an inclined ramp portion 52. The ramp portion 52 may, as illustrated, be generally straight in section or curved, for example concavely curved. Ideally, there should be a smooth transition between the base end sealing surface 46 and the ramp 52. The purpose of this ramp 52 will be described further below.

Figure 11:
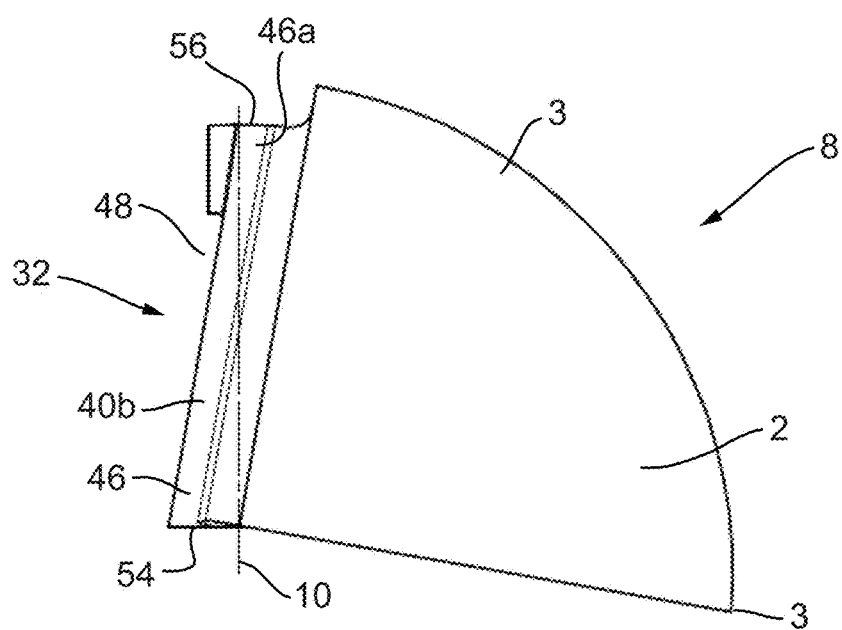
FIG. 11 shows a top plan view of the flapper element of FIG. 9.

The base end 32 of the flapper element 8 also has a radially inwardly facing edge region 54 and a radially outwardly facing edge region 56. These edge regions lie generally perpendicular to the pivot axis 10 as best illustrated in FIGS. 11 and 12.

The relative positioning and interaction of the valve housing 4 and the flapper elements 8, and the operation of the check valve 2 will now be described.

In the closed position illustrated in FIGS. 1 and 2, as would occur when a fluid attempts to flow in the direction of arrow A in FIG. 1, the first edge region 34a of each flapper element 8 is received on the valve housing sealing surface 16, forming a seal therewith. In addition, the second edge region 36a of each flapper element 8 is received on the base end sealing surface 46 of an adjacent flapper element 8. As illustrated schematically in FIG. 8, this forms a seal S around substantially the entire periphery of the valve housing opening 6 and between the adjacent flapper elements 8. There are relatively small gaps 60, 62 formed respectively between the flapper elements 8 and the hub element 24 and between the flapper elements 8 and the valve housing. The first gaps 60 are formed a portion 54a of the inwardly facing edge region 54 of the base end 32 adjacent the mounting lug 40 and the opposing surface of the hub element 24. The second gaps 62 are formed between radially outward facing edge regions 56 of the base ends 32 of the flapper elements 8 and an inner surface of the valve opening 6. However, as these gaps 60, 62 are narrow and long, very little flow will be possible therethough in the closed position, effectively creating sealing cooperation between the respective elements. Additional sealing elements, for example resilient seals, may be provided in these regions if necessary. Flow is thus completely or substantially prevented through the check valve 2 in this condition.

Figure 7:
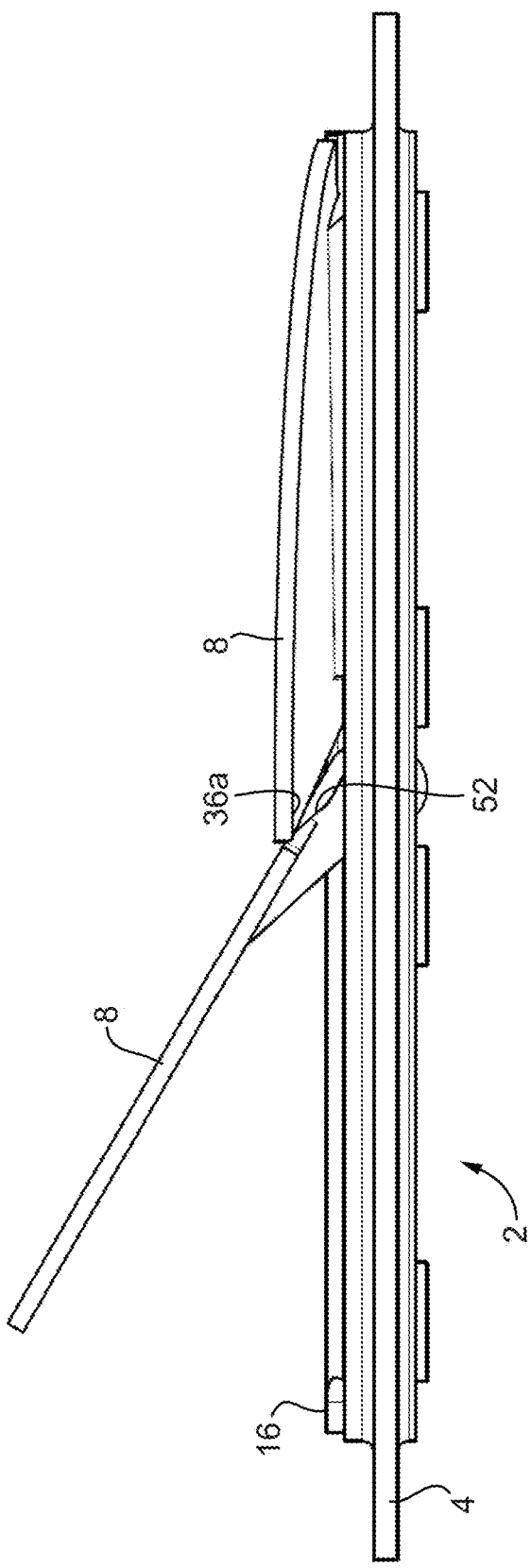
FIG. 7 shows a side of the check valve of FIG. 1 in an intermediate position.
Figure 8:
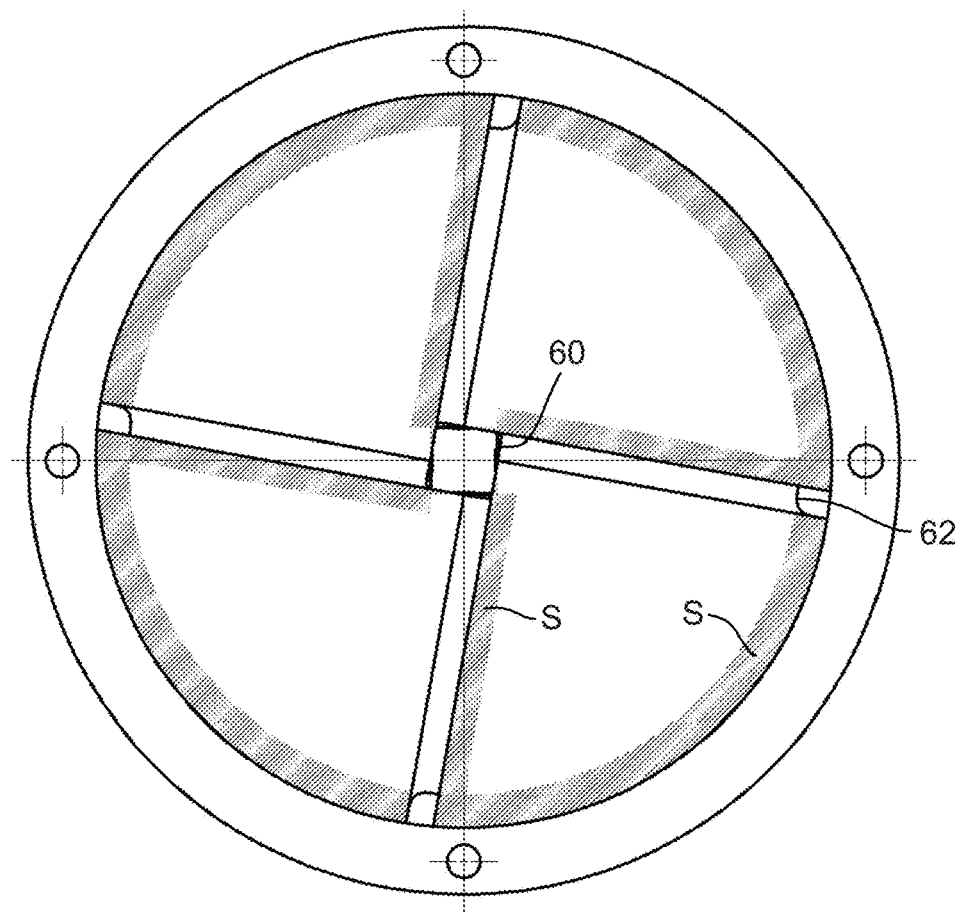
FIG. 8 shows, schematically sealing areas in the closed position of the flapper elements.
Figure 9:
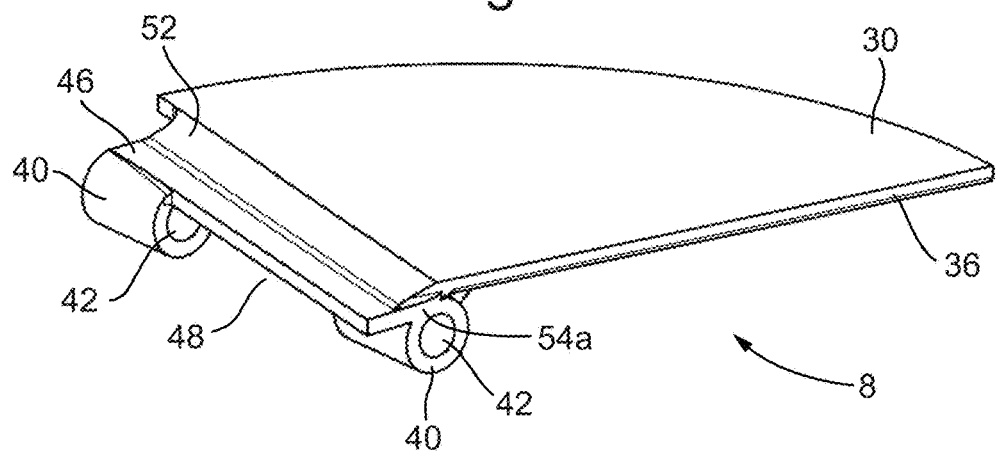
FIG. 9 shows a top perspective view of a flapper element of the check valve of FIG. 1.
Figure 10:
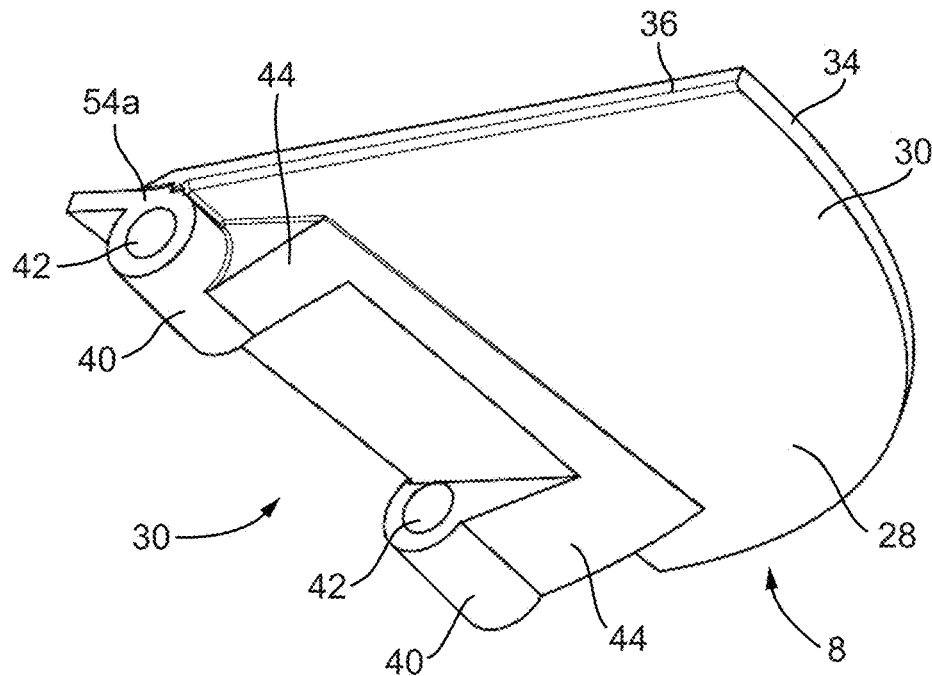
FIG. 10 shows a bottom perspective view of a flapper element of the check valve of FIG. 9.

When fluid attempts to flow in the opposite direction, illustrated by arrow B in FIG. 1, once a predetermined pressure differential (the so-called cracking pressure of the valve) has been established, the flapper elements 8 will begin to rotate about the shafts 20. As any one flapper element 8 begins to lift, as illustrated in FIG. 7, it will begin to lift the adjacent flapper element 8 whose second edge region 36a has been in contact with its base end sealing surface 46. This is because the second edge region 36a will be cammed upwardly by the ramp 52 as illustrated in FIG. 7. This will assist in the opening of the valve 2. To assist in this function, the ramp 52 may be provided with a low friction and/or hard wearing coating such as of PTFE.

Figure 4:
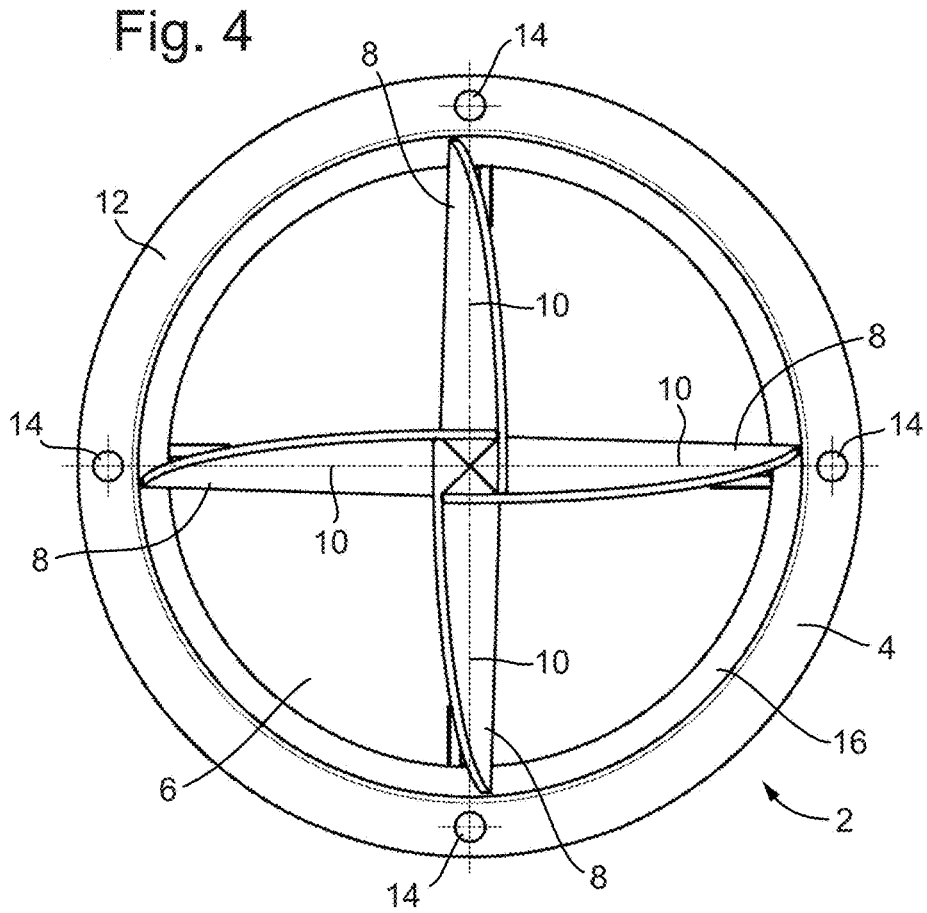
FIG. 4 shows a top plan view of the check valve of FIG. 1 in the open position.
Figure 5:
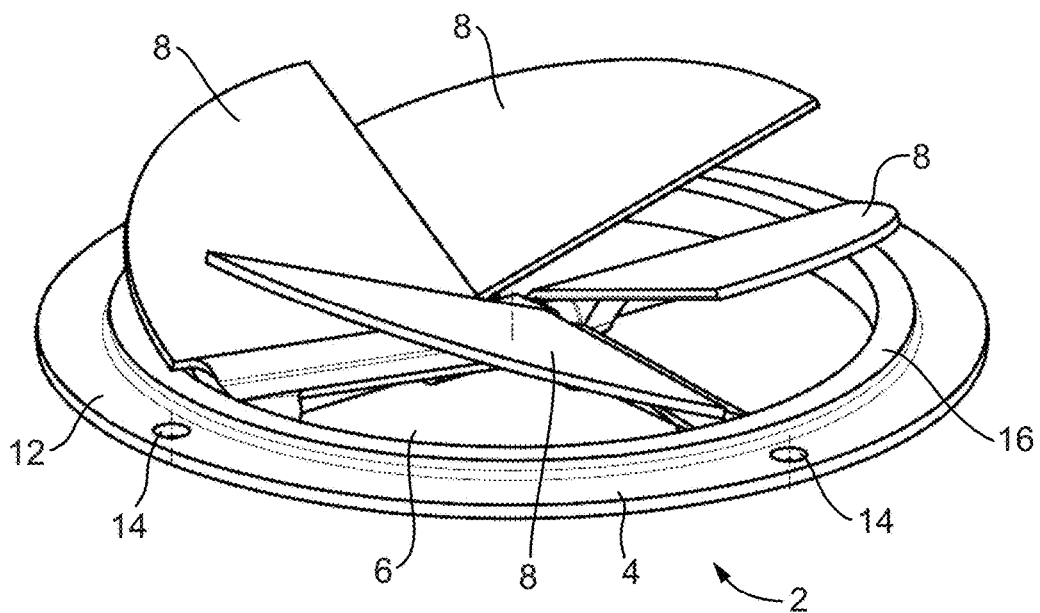
FIG. 5 shows a top perspective view of the check valve of FIG. 1 in an intermediate position.
Figure 6:
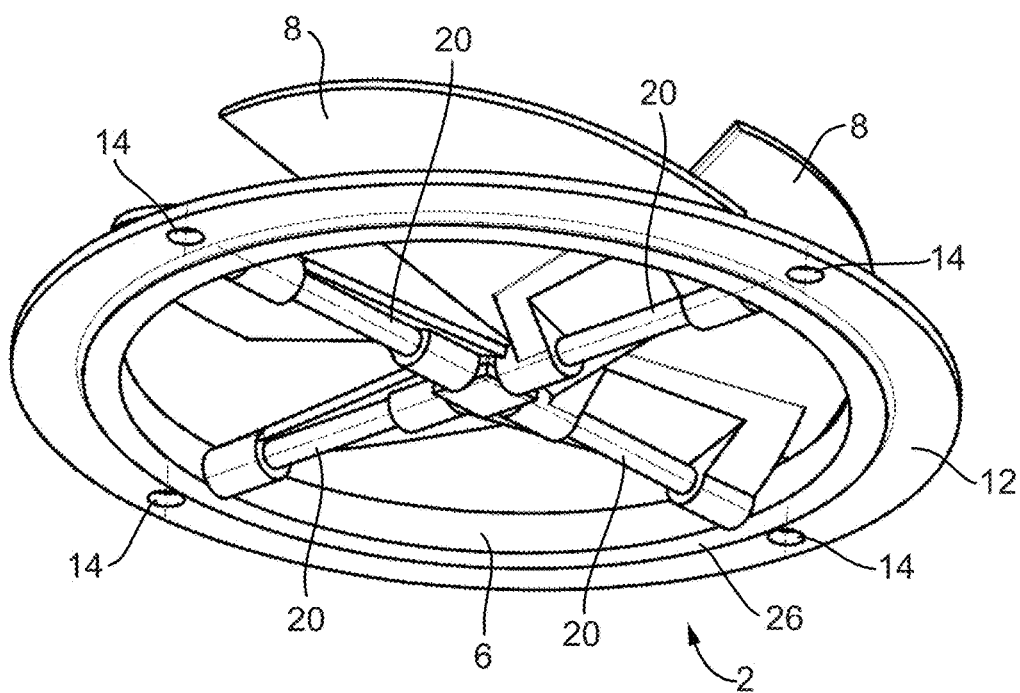
FIG. 6 shows a bottom perspective view of the check valve of FIG. 1 in an intermediate position.

The flapper elements 8 will continue to rotate about the shafts 20 until they reach the position shown in FIGS. 3 and 4. In this position, the first edge 34 of each flapper element will abut the second side 30 of an adjacent flapper element 8 along a line contact 70. In this way, the flapper elements 8 act as stops for one another, avoiding the need to provide additional stop elements as was common in the prior art. As can be seen particularly in FIG. 4, substantially the entire opening 6 is exposed, potentially leading to a relatively low pressure drop over the valve 2. The degree of opening of the flapper elements 8 and the length of the line contact 70 may be varied by varying the angle α. A higher angle will potentially allow a greater degree of opening of the flapper element 8, but a smaller contact length 70. This angle may be chosen empirically to give an appropriate balance between the open area of the valve 2 and the length of the line contact 70.

The embodiment illustrated has a number of advantages. As there are multiple flapper elements 8, the mass of each flapper element 8 may be reduced compared to a standard two-element construction, leading to a reduction in the impact forces when the flapper elements 8 open and close. Also, the impact forces are distributed along a length 70 of each flapper element 8, thereby also limiting local impact forces. This may lead to a prolonged valve life or mean time between maintenance.

The embodiment illustrated also has the advantage that it is relatively shallow, and compact.

The embodiment described above is merely exemplary and the skilled person will appreciate that modifications may be made thereto without departing from the scope of the disclosure.

For example, while the check valve 2 has been illustrated with four flapper elements 8, other numbers of flapper elements may be used. In particular even numbers of flapper elements above 4 may be used, although a greater the number of flapper elements may add complexity to the construction.

The invention claimed is:

1. A check valve comprising:
   a valve housing defining an opening;
   a valve housing sealing surface surrounding the opening;
   a plurality of flapper elements, each flapper element being pivotally mounted to the valve housing about a respective pivot axis transverse to the opening, for rotation between an open position in which the flapper elements permit flow of fluid through the opening and a closed position in which they block the flow of fluid through the opening;
   each flapper element comprising:
      a first side facing the valve housing sealing surface in the closed position;
      a second side, opposed to the first side and facing away from the valve housing sealing surface in the closed position;
      a base end, the flapper element being mounted to the valve housing at its base end;
      a first edge sealing region extending away from the base end for sealing engagement with the valve housing sealing surface in the closed position of the flapper element; and
      a second edge sealing region extending away from the base end for sealing engagement with the base end of an adjacent flapper element in the closed position of the flapper element, an edge of the second edge sealing region of the flapper element engaging with the second side of an adjacent flapper element when the flapper elements are in the open position;
   wherein the second edge sealing region comprises an edge which extends as a straight edge from a radially inner point adjacent the pivot axis to a radially outermost point at the first edge sealing region, said straight edge of the second edge sealing region of the flapper element forms an acute angle (α) with the pivot axis of the flapper element.

2. A check valve as claimed in claim 1, wherein said edge of said second edge sealing region engages the second side of the adjacent flapper element along a line contact when the flapper elements are in the open position.

3. A check valve as claimed in claim 1, wherein the pivotal axes are defined by respective shafts which extend inwardly across the valve housing opening towards a central axis of the opening, the base portion of each flapper element being pivotally supported on a respective shaft.

4. A check valve as claimed in claim 3, wherein the shafts are joined by a hub element in the central axis region of the opening.

5. A check valve as claimed in claim 1, wherein the acute angle (α) is between 75° and 85°.

6. A check valve as claimed in claim 1, comprising four flapper elements, the pivot axes of the four flapper elements being perpendicular to one another.

7. A check valve as claimed in claim 1, wherein the opening is circular and the first edge sealing region of the flapper element is arcuate.

8. A check valve as claimed in claim 1, wherein the acute angle (α) is 80°.

9. A check valve comprising:
a valve housing defining an opening;
a valve housing sealing surface surrounding the opening;
a plurality of flapper elements, each flapper element being pivotally mounted to the valve housing about a respective pivot axis transverse to the opening, for rotation between an open position in which the flapper elements permit flow of fluid through the opening and a closed position in which they block the flow of fluid through the opening;
each flapper element comprising:
a first side facing the valve housing sealing surface in the closed position;
a second side, opposed to the first side and facing away from the valve housing sealing surface in the closed position;
a base end, the flapper element being mounted to the valve housing at its base end;
a first edge sealing region extending away from the base end for sealing engagement with the valve housing sealing surface in the closed position of the flapper element; and
a second edge sealing region extending away from the base end for sealing engagement with the base end of an adjacent flapper element in the closed position of the flapper element, an edge of the second edge sealing region of the flapper element engaging with the second side of an adjacent flapper element when the flapper elements are in the open position;
wherein the second edge sealing region comprises an edge which extends as a straight edge from a radially inner point adjacent the pivot axis to a radially outer point adjacent the periphery of the flapper element, said straight edge of the second edge sealing region of the flapper element forms an acute angle (α) with the pivot axis of the flapper element;
wherein the pivotal axes are defined by respective shafts which extend inwardly across the valve housing opening towards a central axis of the opening, the base portion of each flapper element being pivotally supported on a respective shaft;
wherein the shafts are joined by a hub element in the central axis region of the opening;
wherein an edge region of the base end of a flapper element sealingly cooperates with an adjacent part of the hub element when the flapper element is in the closed position.

10. A check valve as claimed in claim 1, wherein the base end of each flapper element comprises a sealing surface along an edge region thereof on the second side of the flapper element for sealing engagement with the first side of the adjacent flapper element in the second edge sealing region thereof.

11. A check valve as claimed in claim 10, wherein said base end sealing surface is co-planar with the valve housing sealing surface in the closed position.

12. A check valve as claimed in claim 10, wherein the base end sealing surface is arranged, at least in part, circumferentially rearwardly of the flapper pivot axis.

13. A check valve as claimed in claim 10, wherein said base end further comprises an inclined ramp surface joining said base end sealing surface to a main body portion of the flapper element.

14. A check valve as claimed in claim 13, wherein said inclined ramp surface is provided with a low friction and/or wear resistant coating.

15. A check valve comprising:
a valve housing defining an opening
a valve housing sealing surface surrounding the opening;
a plurality of flapper elements, each flapper element being pivotally mounted to the valve housing about a respective pivot axis transverse to the opening, for rotation between an open position in which the flapper elements permit flow of fluid through the opening and a closed position in which they block the flow of fluid through the opening;
each flapper element comprising:
a first side facing the valve housing sealing surface in the closed position;
a second side, opposed to the first side and facing away from the valve housing sealing surface in the closed position;
a base end, the flapper element being mounted to the valve housing at its base end;
a first edge sealing region extending away from the base end for sealing engagement with the valve housing sealing surface in the closed position of the flapper element;
a second edge sealing region extending away from the base end for sealing engagement with the base end of an adjacent flapper element in the closed position of the flapper element, an edge of the second edge sealing region of the flapper element engaging with the second side of an adjacent flapper element when the flapper elements are in the open position,
wherein the base end of each flapper element comprises a sealing surface along an edge region thereof on the second side of the flapper element for sealing engagement with the first side of the adjacent flapper element in the second edge sealing region thereof, wherein said base end further comprises an inclined ramp surface joining said base end sealing surface to a main body portion of the flapper element, wherein the second edge region of the adjacent flapper element being cammed in an opening direction by said inclined ramp surface as the flapper element comprising the inclined ramp surface moves in an opening direction.

\* \* \* \* \*